April 24, 1962 G. F. BADER 3,030,792
ELECTRICALLY CONTROLLED STEAM SPOTTING MACHINE
Filed Sept. 18, 1958 4 Sheets-Sheet 1

Gilbert F. Bader
INVENTOR.

April 24, 1962        G. F. BADER        3,030,792

ELECTRICALLY CONTROLLED STEAM SPOTTING MACHINE

Filed Sept. 18, 1958        4 Sheets-Sheet 2

Gilbert F. Bader
INVENTOR.

April 24, 1962 G. F. BADER 3,030,792
ELECTRICALLY CONTROLLED STEAM SPOTTING MACHINE
Filed Sept. 18, 1958 4 Sheets-Sheet 3

Gilbert F. Bader
INVENTOR.

BY Clarence A. O'Brien
and Harvey B. Jacobson
Attorneys

April 24, 1962  G. F. BADER  3,030,792
ELECTRICALLY CONTROLLED STEAM SPOTTING MACHINE
Filed Sept. 18, 1958  4 Sheets-Sheet 4
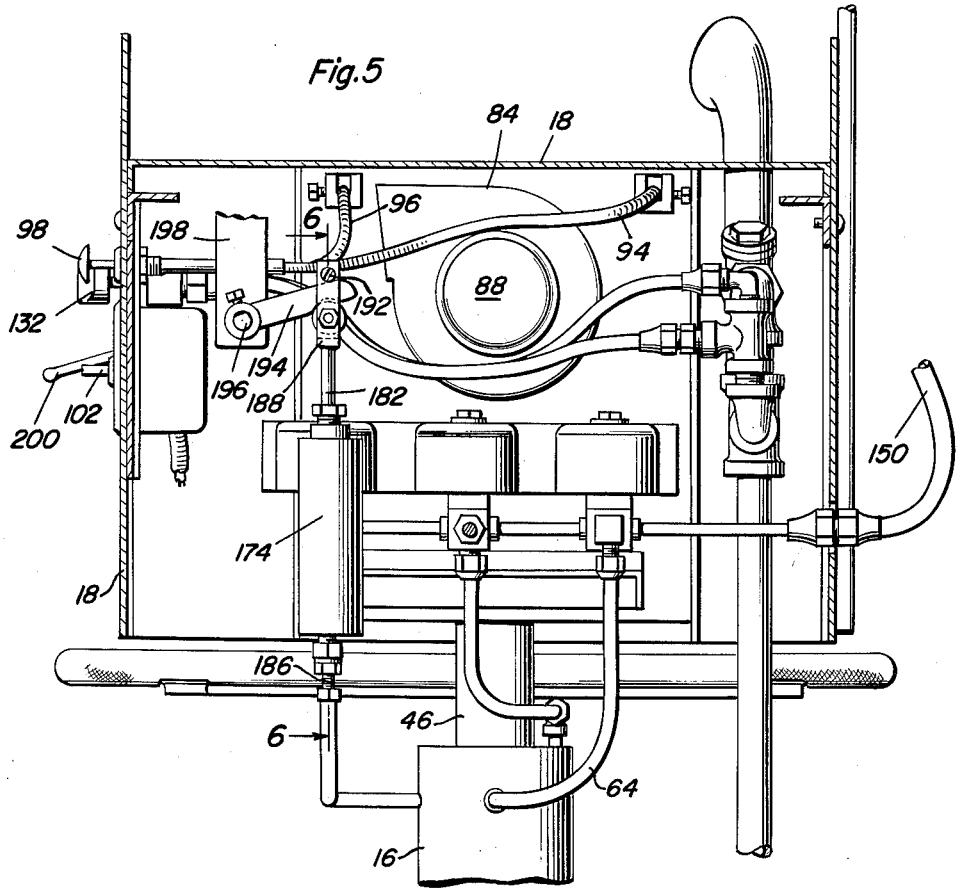
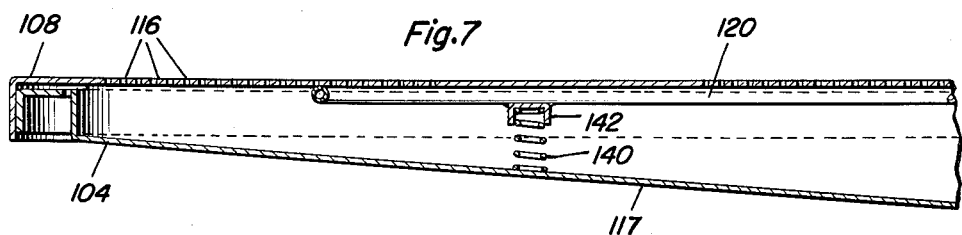
Gilbert F. Bader
INVENTOR.
BY *Clarence A. O'Brien
and Harvey B. Jacobson*
Attorneys United States Patent Office 3,030,792
Patented Apr. 24, 1962

3,030,792
ELECTRICALLY CONTROLLED STEAM
SPOTTING MACHINE
Gilbert F. Bader, 800 S. Elm, McPherson, Kans.
Filed Sept. 18, 1958, Ser. No. 761,797
6 Claims. (Cl. 68—240)

This invention comprises a novel and useful electrically controlled steam spotting machine and more particularly relates to an apparatus providing an improved construction of a spotting board.

The present invention relates to a complete steam spotting board assembly such as presently used in the dry cleaning business for removing spots and stains from clothing and other material prior to the time they are subjected to the regular cleaning process, and thereafter. The improvements effected by the present invention reside in the steam spotting board construction. The improvements effected by this invention and the spotting board assembly are applicable to a single board spotting machine as well as to a split board spotting machine. For better comprehension of the principles of this invention as to its various phases the apparatus illustrated in the accompanying drawings is of the split board type comprising two spaced legs, each of which is steam heated in a novel manner for the usual purposes common in such type of apparatus.

In spotting operations as customarily practiced in the cleaning industry bacterial agents are frequently employed to remove blood spots and spots formed by other digestible material from the article to be cleaned, the bacterial agent being employed to digest the blood spots and other digestible material. Such bacteria must be kept moist at all times and at a given uniform temperature for efficient operation. If the temperature is too cold they will die or become inactive and if it is too hot they will be killed. It is therefore important that a precise control of this heat applied by the steam heating coil to the spotting board as well as the temperature or quantity of steam supplied to the spotting gun is necessary for effective operation.

Further, it is frequently desirable to maintain the two spotting legs of a split spotting board at different temperatures so that the precise desired temperature may be maintained in that leg upon which an article is being treated with a bacterial digesting agent, while simultaneously the other leg may be operated at a higher temperature to more efficiently perform other spotting operations upon garments placed thereon.

It is further desirable in a spotting board assembly to dry the surface of the board upon which an article is to be placed as quickly as possible and to maintain this surface dry as much as possible in order to expedite the spotting operation thereon and to prevent undue moistening of a garment or article placed thereon.

It is therefore the primary purpose of the present invention to provide a means for removing various spots and stains from clothing and other material when preparing the latter for conventional cleaning processes or for spotting the same after the completion of conventional cleaning processes.

A further object of the invention is to provide a means in accordance with the preceding object which will be specifically applicable to both the single board and the split board type of spotting apparatuses.

A still further and very important object of the invention is to provide a steam spotting board wherein the operation of the same shall be effective electrically thereby relieving the operator of all of the foot and most of the manual hand operation heretofore necessary for controlling the temperature of the spotting board.

Yet another object of the invention is to provide an improved construction of the spotting board wherein a steam separator, conventionally employed to selectively supply dry steam and wet steam for use in the spotting operations may be conveniently incorporated into the support column of the apparatus.

A further important object of the invention is to provide a spotting board in accordance with the foregoing objects which will provide an independent control of the heat of each leg of a split type board and/or will provide an individual control of the vacuum applied to the interior of either or both of the hollow legs of a two leg spotting board and thereby control the rapidity of the drying of the board.

Another important object of the invention is to provide a split spotting board having means for separately and controllably preheating either leg of the board to minimize condensation of steam thereon and thus reduce the resultant undesirable wetting of the material to be treated thereon.

Still another important object of the invention is to render more effective the bacterial treating agent employed for removing blood spots and other digestible material from articles being treated by preheating and accurately controlling the temperature of one leg of the board upon which an article is placed for treatment by the bacterial agent to secure the optimum temperature and humidity conditions for utilizing such bacterial agents to the best advantage.

An additional object of the invention is to provide means for controlling the application of a vacuum to either leg of the board whereby to effect rapid withdrawal of any leakage steam or undesired moisture and increase the drying speed of the material being treated thereon.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 5 is a vertical sectional view taken substantially upon the plane indicated by the broken section line 5—5 of FIGURE 3 and showing in general a rear elevational view of the apparatus housed in the compartment at the upper end of the support column;

FIGURE 6 is a detail view in vertical section taken substantially upon the plane indicated by the section line 6—6 of FIGURE 5 and showing in particular a manually operated valve assembly for regulating the flow of dry steam to the spotting gun;

FIGURE 7 is a fragmentary detail view taken in vertical longitudinal section through one of the spotting board legs and showing in particular the resiliently supported steam heating coils therein and the manner in which these coils are resiliently urged directly against the removable cover of the hollow leg and into good heat exchange relation therewith;

Figures 1, 2:
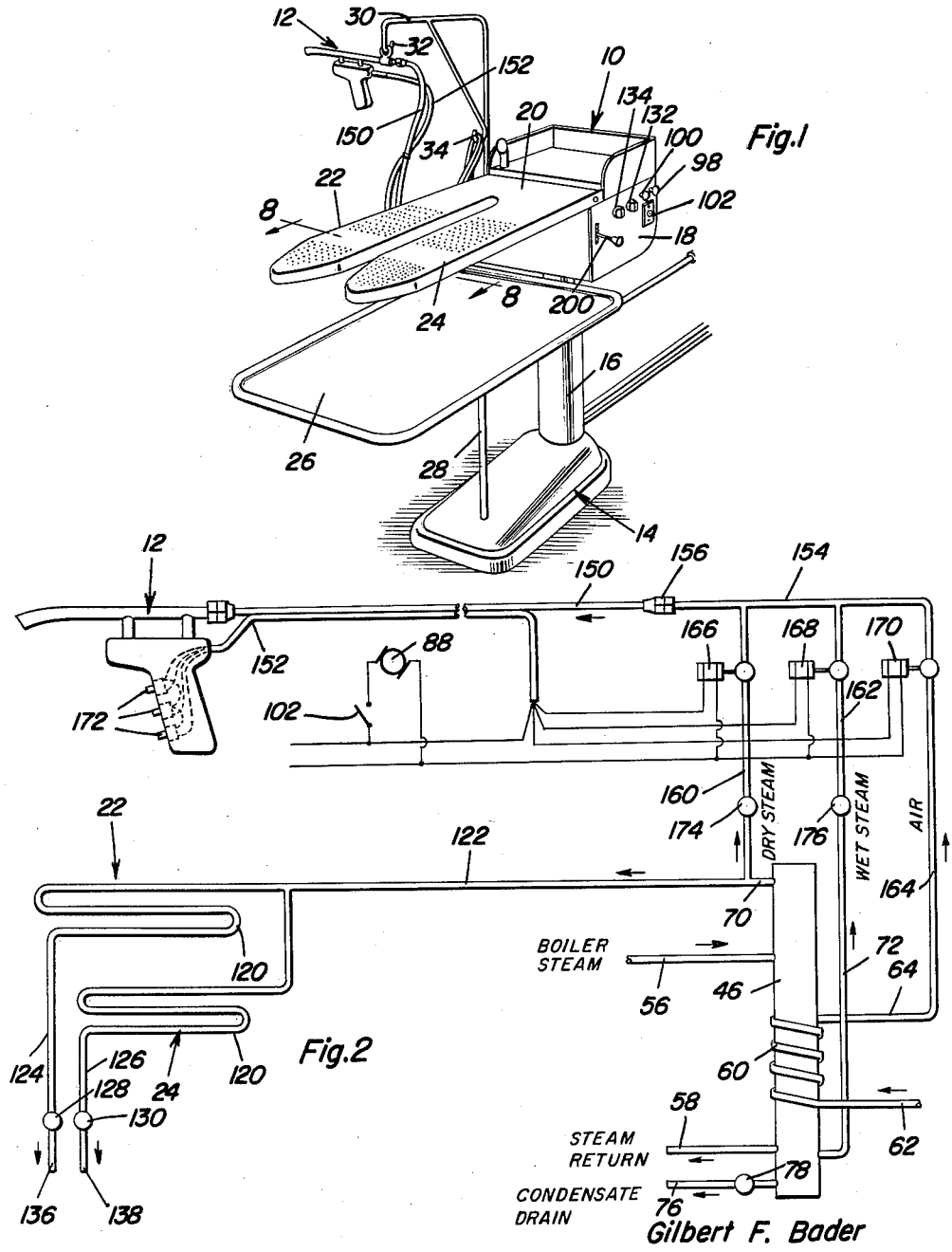
FIGURE 1 is a perspective view of a split board spotting device in accordance with this invention, a spotting gun being shown supported conveniently with respect to the split spotting board.
FIGURE 2 is a diagrammatic view of the fluid and electrical circuits of the apparatus of FIGURE 1.
Figure 3:
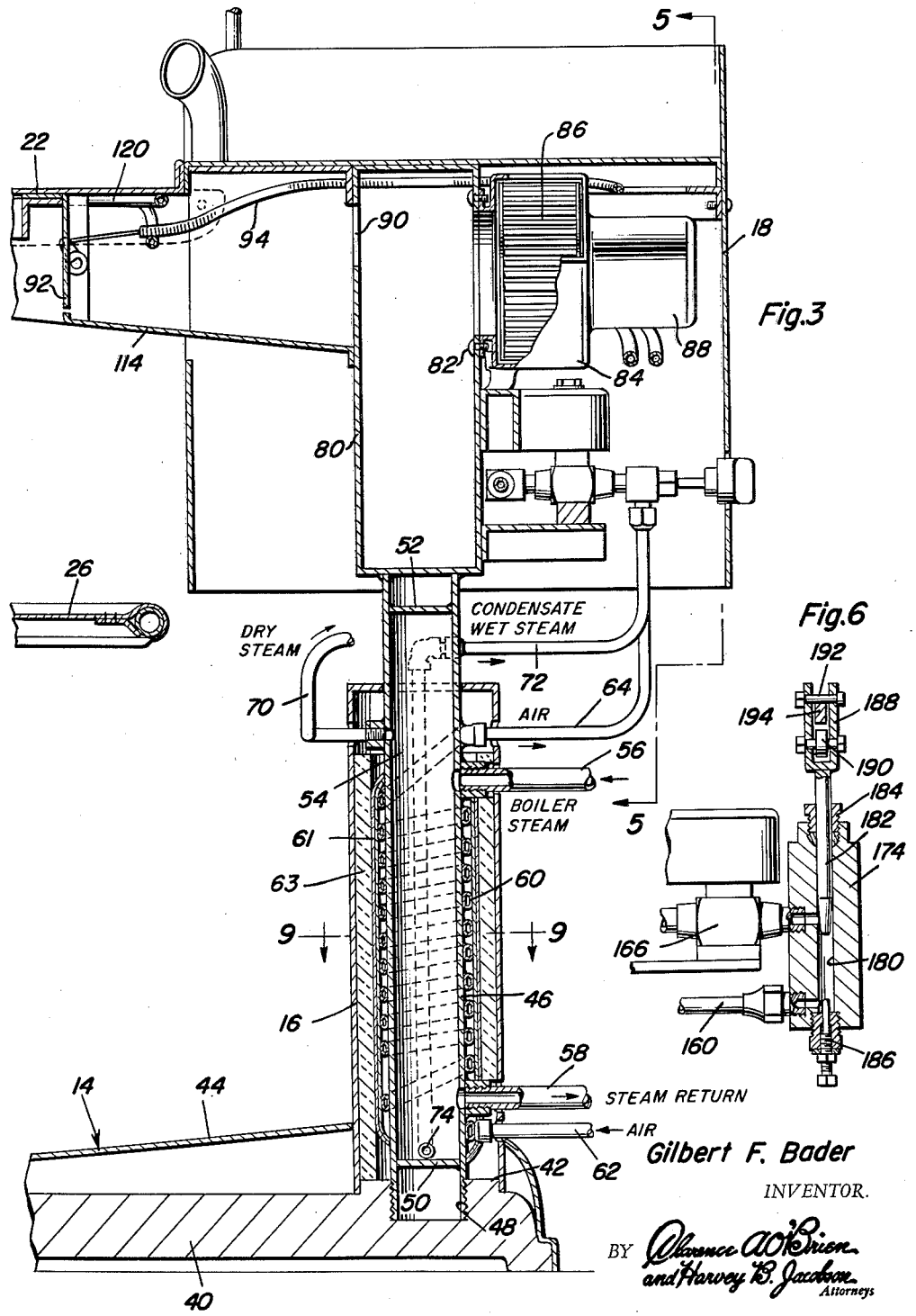
FIGURE 3 is a view upon an enlarged scale, taken partly in elevation and partly in vertical section, with parts omitted and broken away, of the support standard and the rear of the spotting board together with certain associated structure of the invention.
Figure 8:
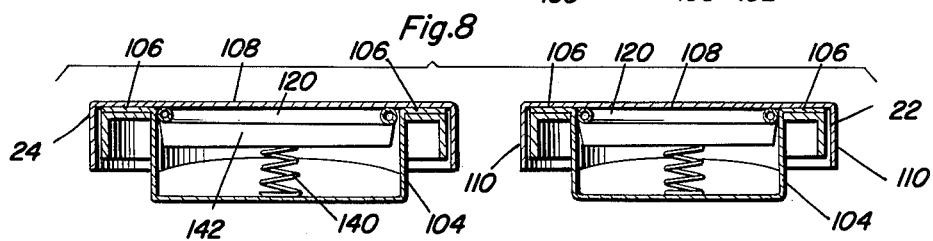
Figure 9:
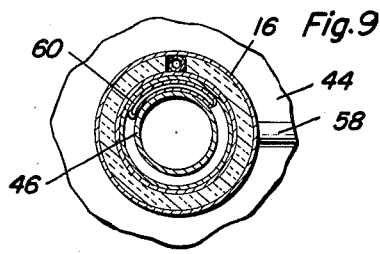

FIGURE 8 is a detail view in vertical transverse section taken substantially upon the plane indicated by the section line 8—8 of FIGURE 1, but upon an enlarged scale and showing the internal structure of the two legs of the spotting board and the resilient supporting means for the heating coils therein; and FIGURE 9 is a detail view in horizontal section taken substantially upon the plane indicated by the section line 9—9 of FIGURE 3 and showing the interior of the tubular support standard of the board, and the association of the air preheating coil with the steam separator therein.

Referring now first to FIGURE 1 it will be seen that the steam spotting apparatus disclosed hereinafter and to which the principles of the present invention have been applied consist of a spotting board assembly designed generally by the numeral 10 together with a steam spotting gun assembly designated generally by the numeral 12. The spotting board assembly consists of a base 14 from which rises a hollow or tubular jacket or casing 16, above the upper end of which there is provided an enlarged housing 18. Projecting laterally from the housing is a split spotting board, the same including a pair of parallel horizontally extending spotting legs 22 and 24. Disposed beneath these spotting legs and suitably carried by the housing portion 18 or the column 16 is a tray 26. Rising from the base 14 is a standard 28 whose upper end is provided with a horizontally extending arm 30 provided with hooks 32 and 34 for supporting respectively the spotting gun 12 and the series of flexible conduits referred to hereinafter by which fluids are selectively supplied to the spotting gun.

Although this type of apparatus is generally conventional, the present invention provides numerous improvements in both the spotting board assembly 10 and in the steam gun assembly 12 in a manner which is to be now described.

*Spotting Board Assembly*

Referring now especially to FIGURE 3, it will be seen that the base 14 includes a lower weighted plate-like support element 40 having a slightly raised boss 42 to which the lower end of the jacket 16 is secured. A covering or casing 44 surrounds the jacket 16 and embraces the periphery of the plate-like support base 40 as shown in FIGURE 3.

Inside of the tubular member 16, is a support column comprising a sleeve or tube 46 whose lower end is threadedly engaged in the bore 48 in the boss 42, and which above its lower end is provided with a partition 50 closing the lower end of this tube or sleeve.

In its upward portion the sleeve, tube or column 46 is provided with a transverse partition 52 and this space within the column between the partitions 50 and 52 comprises a chamber 54 which as set forth hereinafter constitutes a steam separator. It is an important feature of the present invention that this steam separator is thus incorporated into the hollow support column of the apparatus.

As further shown in FIGURE 3 and diagrammatically indicated in FIGURE 2, steam from a boiler or other suitable source is introduced into the separator 54 by means of a conduit or inlet pipe 56 adjacent the upper portion of the separator and is discharged from the lower portion of the separator by the discharge pipe or conduit 58 which may conduct the steam back to the boiler and thus effect a circulation of steam through the separator and maintain steam therein at a predetermined pressure and temperature.

Disposed within the enclosing casing 16 of the tubular column is a heating coil 60, the same having an air inlet conduit 62 together with an air discharge conduit 64. This coil is in intimate heat exchange relation with the separator 46 so that the steam in the latter will preheat the air, which air is subsequently supplied to the steam gun 12 in a manner to be set forth hereinafter. As shown in FIGURE 3, the air coil 60 is surrounded by a jacket or sheath of aluminum foil 61 and a coating of insulating material such as air cell asbestos or the like at 63 surrounds the foil and is enclosed by the jacket 16.

Adjacent the upper end of the chamber 54 in the steam separator is a conduit 70 by which dry steam is educted from the separator for use in heating the spotting legs 22 and 24 and for use in the steam gun 12 all as set forth hereinafter.

A further conduit 72 has its adit 74 disposed at the lowermost portion of the chamber 54 just above the partition 50 whereby condensate or wet steam may be withdrawn from the separator for use in the steam gun as described later. A condensate drain conduit 76, indicated in FIGURE 2 but not shown in FIG. 3 and having a conventional control valve 78 thereon is employed for periodically removing condensate from the separator chamber as may be necessary.

With continuing reference to FIGURE 3 it will be observed that the casing 18 previously mentioned is mounted upon, is supported by and surrounds the upper end of the support column, constituted by the tube 46. Supported on the upper end of this column is a box 80 upon which the fan casing 84 is mounted and supported as by bolts 82. There is provided a conventional form of squirrel cage type fan rotor 86 therein operated by a motor 88. The inlet of the box 80, shown at 90 extends into and has sealed engagement with the hollow spotting board 20, which latter in turn extends into and is secured to and supported by the casing 18 in any suitable manner.

It will now be understood that each of the hollow interiors of the spotting legs 22 and 24 of the spotting board 20 are continuously in communication with the inlet opening 90 of the suction fan 86 so that upon operation of this motor suction is applied to the interior of each spotting board leg.

Figure 4:
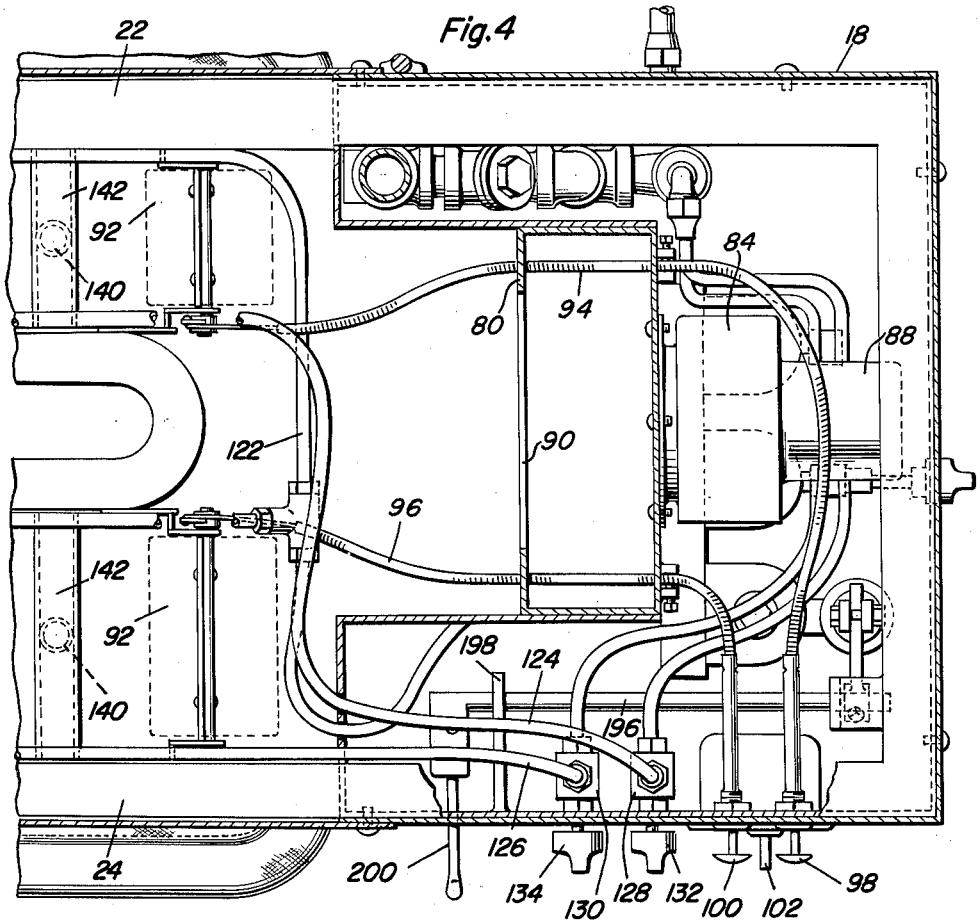
FIGURE 4 is a view in horizontal section of the rear portion of the upper part of the apparatus and with the cover removed and showing the mechanism housed within the upper portion of the support column and the manner in which the same is operatively associated with the two spotting legs of the split board.

As set forth hereinafter, each hollow spotting board leg includes numerous perforations whereby atmospheric air may be drawn into the interior thereof in response to the suction applied to the interior of the legs by the suction fan 86. A vane type of control valve 92, see FIGURE 4, is provided in each of the hollow legs adjacent the communication of the latter with the interior of the spotting board 20 and adjacent the suction fan inlet 90, whereby to regulate independently the amount of suction applied to each of the spotting board legs 22 and 24. As shown in FIGURE 4, the two valves 92 are independently controlled by conventional flexible Bowden cable controls 94 and 96 respectively for the suction control valves 92 of the legs 22 and 24, these control cables in turn being provided with manual operating buttons 98 and 100 respectively which are conveniently mounted upon one side of the casing 18, as will be also apparent from FIGURE 1.

At this point it may be observed that the operation of the suction fan motor 88 is in turn controlled by a switch 102 located adjacent the previously mentioned buttons 98 and 100.

Referring now specifically to FIGURE 4 in conjunction with FIGURES 7 and 8, it will be understood that each of the hollow spotting legs 22 and 24 comprises a U-shaped bottom pan 104 having flanged upper ends 106 and a U-shaped inverted removable top 108 overlies the flanged upper ends and has downturned flanges 110 at its opposite sides. As will be best seen from FIGURE 7, the lower pan 104 has its bottom wall 117 downwardly sloping towards the bottom wall extending across the spotting board 20 and towards the inlet 90 as shown also in FIGURE 3. This top wall or upper inverted pan 108 is slidable lengthwise upon the lower pan 104 to form a closure for the latter. As shown in FIGURE 7, a plurality of perforations 116 are provided in the cover 108 whereby atmospheric air may enter the same under the suction applied to the interior of the leg by the inlet 90 of the suction fan 86. The quantity of air flowing through the openings 116 may thus be regulated through regulation of the suction control valves 92 as previously mentioned and thus the drying effect upon material placed upon the top surface 108 of the spotting legs can be regulated independently for the legs and with accuracy.

Disposed in each of the hollow legs is a substantially U-shaped steam heating coil 120 having its two ends disposed adjacent the support column and casing 18 where they are connected at one leg of each as by a conduit 122 to the previously mentioned dry steam supply conduit 70, see also FIGURE 2, and are connected at their other ends by the conduits 124 and 126 to control valves 128 and 130 actuated by control knobs or buttons 132 and 134 respectively and from thence by the conduits 136 and 138 respectively to a common drain, not shown. Since as suggested in FIGURE 2 the conduit 70 continuously supplies dry steam through the conduit 122 to each of the heating coils 120, the rate of flow through the coils and consequently the extent of heat imparted to the coils and from the coils to the spotting legs may be effectively controlled by manual operation of the drain valves 128 and 130. This permits independent control of the heating of each of the spotting legs in order to obtain the advantages referred to hereinbefore.

In accordance with the present invention, the heating coils 120 are movably supported in their legs and are yieldingly urged by the compression springs 140 bearing against horizontal support brackets 142, against the removable top 108, whereby the heating coils are in direct and optimum heat exchange relation with this top.

The arrangement is such that when the tops are removed, the heating coils may be elevated and removed whereby the interior of the leg may be cleansed or serviced as required.

*Spotting Gun Assembly*

The steam spotting gun 12 is of a conventional type, the same having a single flexible tube 150 for supplying selected fluids thereto, together with an electric cable assembly 152 for controlling the flow of these fluids as set forth hereinafter.

Referring now especially to FIGURE 5 in conjunction with FIGURE 4 it will be seen that there is provided a manifold 154 located within the casing 18 and suitably supported therein. This manifold is connected to the conduit 150 as by a coupling 156, see FIGURE 2, and directly supplies fluid to this conduit and to the gun. As shown best in the diagrammatic view of FIGURE 2, conduits 160, 162 and 164 connect the manifold 154 respectively with the conduit 70 supplying dry steam from the separator 46, the conduit 72 supplying wet steam therefrom and the conduit 64 supplying heated air from the coil 60. These three supply conduits are provided with solenoid control valves 166, 168 and 170 respectively. These valves are normally closed but are opened when the solenoids are energized to thereby permit flow of the selected fluid into the manifold 154 and from thence into the gun 12. Each of the solenoids is controlled by an electric circuit as indicated in FIGURE 2, the electric conductors of these circuits passing through the previously mentioned cable assembly 152, and including a plurality of push button switches each designated by the numeral 172 and mounted upon the gun. The arrangement is such that when a selector switch 172 is depressed, the corresponding solenoid valve 166, 168 or 170 will be energized and fluid will then pass through the selected supply line or supply lines into the manifold from thence to the gun. It will thus be seen that various combinations of dry steam, wet steam or air, or any of these fluids alone can be suppled to the gun thereby providing a very effective means for regulating the discharge from this gun for treating spots.

In order to enable the rate of flow of dry steam or wet steam to the gun to be regulated, there are provided manually operated regulating valves 174 and 176 respectively in the supply conduits 160 and 162, preferably upon the upstream sides of the solenoid valves.

The wet steam manually controlled regulating valve 176 may be actuated by the control knob 178 extending to the exterior of the casing 18, as shown in FIGURE 3 and in FIGURE 4.

However, for regulating the opening of the dry steam regulating valve 174, a different type of control means is preferred. For this purpose there is provided a valve casing 174 having a bore 180 therein into which the dry steam supply conduit 160 communicates, and from which there is communication with the solenoid valve 166 as shown in FIGURE 6. A slidable needle valve 182 is slidably received in the bore 180, passing through a packing gland 184 therein. At the lower end of the bore there is provided an adjustable screw stop 186 for engagement by the lower end of the needle valve 182 and thus limit the downward travel of the latter. As will be apparent, the position of the needle valve in the bore with respect to the ports communicating with the valve 166 and the supply line 160 will throttle or regulate the flow of fluid through this supply line. This valve is necessary since the solenoid valve merely opens or closes the flow completely but does not offer any regulation as to the rate of flow.

Secured to the upper end of the needle valve stem 182 is a yoke 188 having journaled therein a roller 190 which lies beneath a transverse retaining pin 192 thereabove. Inserted in the yoke between the roller and retaining pin is one end of a lever 194, see FIGURES 4 and 5, which lever constitutes an arm upon the shaft or axle 196 journaled in suitable brackets or bearings 198, and which has an actuating arm 200 extending from one end thereto through the side wall of the housing 18. By moving the lever 200 to different ranges of movement, different vertical positions can be imparted to the needle valve 182, whereby a precise control of the rate of flow of dry steam to the manifold and thence to the gun may be readily effected.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. A spotting board comprising a hollow support column, a hollow, horizontally projecting spotting leg on the upper part of said column, a pair of spaced transverse partitions fixed in said column defining, a steam separator therebetween, means for supplying steam between said partitions to said separator, a steam heating coil in said leg, a conduit connecting said coil to said separator and supplying dry steam from the latter to the former, a discharge valve on said coil controlling the flow of steam through said coil and thereby regulating the temperature of said leg, resilient means supporting said coil in said leg and yieldingly maintaining the coil in contact with the top of said leg whereby to effect a good heat exchange relation therewith, said conduit connecting said coil to said separator having communication with the upper portion of said separator whereby to deliver dry steam therefrom.

2. A spotting board including a support column and a hollow, horizontally projecting spotting leg on the upper portion thereof, a steam heating coil in said leg and means for controlling a supply of steam thereto, resilient means in said leg supporting said coil and yieldingly maintaining it in contact with the top of the leg and in good heat exchange relation with the latter.

3. A spotting board including a support column and a hollow, horizontally projecting spotting leg on the upper portion thereof, a steam heating coil in said leg and means for controlling a supply of steam thereto, resilient means in said leg supporting said coil and yieldingly maintaining it in contact with the top of the leg and in good heat exchange relation with the latter, the top of said leg comprising a fluid pervious cover, means for applying suction to the interior of said leg and thereby drawing air through said cover.

4. The combination of claim 3 including means controlling the amount of suction applied to said leg.

5. A split spotting board comprising a hollow support column, a pair of spaced, horizontally extending, hollow spotting legs each supported by the upper portion of said column, a steam heating coil in each leg, a pair of spaced transverse partitions fixed in said column defining a steam separator therebetween, means supplying steam between said partitions to said separator, and a conduit connecting said separator to said coils, means for applying suction to the interior of each leg and for causing thereby a flow of air into each leg, control means regulating the quantity of suction applied to each leg, resilient means in each leg supporting the steam heating coil therein and yieldingly maintaining said coil in contact with the top of its leg whereby to effect a good heat exchange relation thereto.

6. The combination of claim 5 including valved discharge means connected to said coil thereby controlling the flow of steam therethrough and the temperature of each leg.

References Cited in the file of this patent

UNITED STATES PATENTS

| | | |
|---|---|---|
| 1,763,761 | Cox | June 17, 1930 |
| 1,984,267 | Holder | Dec. 11, 1934 |
| 2,284,572 | Holder | May 26, 1942 |
| 2,360,331 | Cissell | Oct. 17, 1944 |
| 2,363,956 | Glover | Nov. 28, 1944 |
| 2,445,592 | Yanchenko | July 20, 1948 |
| 2,565,133 | Keyes | Aug. 21, 1951 |
| 2,593,080 | Wilkey | Apr. 15, 1952 |
| 2,606,069 | Hutchins | Aug. 5, 1952 |
| 2,658,370 | Richterkessing | Nov. 10, 1953 |
| 2,787,900 | Chrisman | Apr. 9, 1957 |
| 2,831,729 | Walker | Apr. 22, 1958 |